(12) United States Patent
Suzuki

(10) Patent No.: US 7,634,180 B2
(45) Date of Patent: Dec. 15, 2009

(54) IMAGING DEVICE

(75) Inventor: Masatoshi Suzuki, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 356 days.

(21) Appl. No.: 11/604,758

(22) Filed: Nov. 28, 2006

(65) Prior Publication Data

US 2007/0122134 A1 May 31, 2007

(30) Foreign Application Priority Data

Nov. 28, 2005 (JP) ............................. 2005-342538

(51) Int. Cl.
G03B 17/00 (2006.01)
(52) U.S. Cl. .................. 396/55; 348/208.2; 348/208.7; 348/208.16
(58) Field of Classification Search ................... 396/55; 348/208.12, 208.16
See application file for complete search history.

(56) References Cited

U.S. PATENT DOCUMENTS

| 5,974,268 A * | 10/1999 | Washisu ..................... 396/55 |
| 7,113,204 B2 * | 9/2006 | Eto et al. ............... 348/208.99 |
| 2001/0022619 A1 * | 9/2001 | Nishiwaki ................... 348/208 |
| 2001/0033331 A1 | 10/2001 | Eto et al. |
| 2005/0052538 A1 * | 3/2005 | Sato et al. ................ 348/208.1 |
| 2005/0068435 A1 * | 3/2005 | Shigemori et al. .......... 348/272 |
| 2005/0168586 A1 * | 8/2005 | Tsubusaki .............. 348/208.99 |
| 2005/0264654 A1 | 12/2005 | Eto et al. |
| 2006/0033817 A1 * | 2/2006 | Ishikawa et al. ......... 348/208.2 |
| 2006/0146166 A1 * | 7/2006 | Abe et al. .............. 348/333.01 |

FOREIGN PATENT DOCUMENTS

| JP | 2000-241845 A | 9/2000 |
| JP | 2001-290186 A | 10/2001 |
| JP | 2002-341398 A | 11/2002 |
| JP | 2003-307762 A | 10/2003 |

* cited by examiner

*Primary Examiner*—William B. Perkey
*Assistant Examiner*—Dennis Hancock
(74) *Attorney, Agent, or Firm*—Sughrue Mion, PLLC

(57) ABSTRACT

The present invention provides an imaging device having a shake correction device which corrects image shake by moving a portion of a photographic lens or by moving an imaging element, which is capable of displaying images obtained from the imaging element as a live view on a monitor prior to photography, the imaging device comprising: a detection device which detects deactivation of the shake correction device; and a display control device which turns off a display of a live view on the monitor for a predetermined period of time upon detection of deactivation of the shake correction device by the detection device.

17 Claims, 11 Drawing Sheets

IMAGING DEVICE

BACKGROUND OF THE INVENTION

1. Field of the Invention

The present invention relates to an imaging device, and particularly, to an imaging device comprising an optical shake correction function which corrects image shake due to camera shake by moving a portion of a photographic lens or moving an imaging element.

2. Description of the Related Art

Many failed photographs may be attributed to camera shake. Shake correction functions are known as functions for preventing occurrences of such failed photographs due to camera shake. There are several methods of performing shake correction functions. For instance, with an optical shake correction function, vertical and horizontal vibrations occurring on a camera main body is detected by a gyro sensor, and a portion of a photographic lens is moved in parallel in a same direction as the vibration to correct image shake due to camera shake (for instance, Japanese Patent Application Laid-Open No. 2000-241845, Japanese Patent Application Laid-Open No. 2001-290186, Japanese Patent Application Laid-Open No. 2003-307762 and Japanese Patent Application Laid-Open No. 2002-341398).

SUMMARY OF THE INVENTION

Generally, a digital camera is equipped with a monitor on its camera main body. Such a digital camera offers an advantage in that photography may be performed while providing live display of images obtained from an imaging element on the monitor. In the case of a digital camera comprising a shake correction function, shake-corrected images (live views) may also be live-displayed on the monitor.

However, a digital camera having a shake correction function suffers from the problems that turning off the shake correction function while displaying a live view causes sudden termination of a correction operation and execution of a return-to-origin operation (centering) by a shake correction lens or an imaging element, resulting in an instantaneous misalignment of the monitor display which discomforts a photographer. In other words, an image taken at the instant in which centering is performed is significantly misaligned from the series of images. As a result, the images lose their continuity and give a sense of discomfort to a photographer.

The present invention has been made in consideration of such circumstances, and its object is to provide an imaging device in which a shake correction function may be switched on/off without causing a sense of discomfort through a monitor.

In order to achieve the above-described object, the invention according to a first aspect provides an imaging device having a shake correction device which corrects image shake by moving a portion of a photographic lens or by moving an imaging element, which is capable of displaying images obtained from the imaging element as a live view on a monitor prior to photography, the imaging device comprising: a detection device which detects deactivation of the shake correction device; and a display control device which turns off a display of a live view on the monitor for a predetermined period of time upon detection of deactivation of the shake correction device by the detection device.

In the invention according to the first aspect, when the shake correction device is deactivated, a display of a live view on a monitor is turned off for a predetermined period of time. By performing centering while the display of a live view on the monitor is turned off, the shake correction device may prevent image misalignment due to centering and may also prevent discomfort to a photographer.

In order to achieve the above-described object, the invention according to a second aspect provides an imaging device having a shake correction device which corrects image shake by moving a portion of a photographic lens or by moving an imaging element, which is capable of displaying images obtained from the imaging element as a live view on a monitor prior to photography, the imaging device comprising: a detection device which detects deactivation of the shake correction device; and a display control device which displays a predetermined image on the monitor for a predetermined period of time upon detection of deactivation of the shake correction device by the detection device.

In the invention according to the second aspect, when the shake correction device is deactivated, the monitor display is changed and a predetermined image is displayed on the monitor for a predetermined period of time. By performing centering while the image is being displayed, the shake correction device may prevent discomfort to a photographer.

In order to achieve the above-described object, the invention according to a third aspect provides the imaging device according to the first or second aspect, the imaging device further comprising: as operating modes, at least a first photography mode which performs photography while operating the shake correction device, a second photography mode which performs photography without operating the shake correction device, and a playback mode which playback-displays photographed images on the monitor; and a mode switching device which switches the operating modes; wherein the shake correction device is activated when the first photography mode is set by the mode switching device, and is deactivated when a photography mode other than the first photography mode is set by the mode switching device.

In the invention according to the third aspect, the shake correction device is activated when the first photography mode is set by the mode switching device, and the shake correction device is deactivated when a photography mode other than the first photography mode is set. In other words, since the display on the monitor is switched for a predetermined period of time according to a timing of switching modes by the mode switching device, the invention may more reliably prevent discomfort to a photographer.

In order to achieve the above-described object, the invention according to a fourth aspect provides an imaging device having a shake correction device which corrects image shake by moving a portion of a photographic lens or by moving an imaging element, which is capable of displaying images obtained from the imaging element as a live view on a monitor prior to photography, the imaging device comprising: a configuration device which causes a configuration screen to be displayed on the monitor for setting activation/deactivation of the shake correction device.

In the invention according to the fourth aspect, setting of activation/deactivation of the shake correction device is performed by displaying a configuration screen on the monitor. This ensures that the display on the monitor is switched to a configuration screen whenever activation/deactivation of the shake correction device is set, even when a live view is displayed. Therefore, a photographer will feel no discomfort even when continuity of the live view is lost.

An imaging device according to the present invention is capable of switching on/off the shake correction function without causing a sense of discomfort on the monitor.

DETAILED DESCRIPTION OF THE PREFERRED EMBODIMENTS

Preferred embodiments of an imaging device according to the present invention will now be described with reference to the attached drawings.

Figure 1:
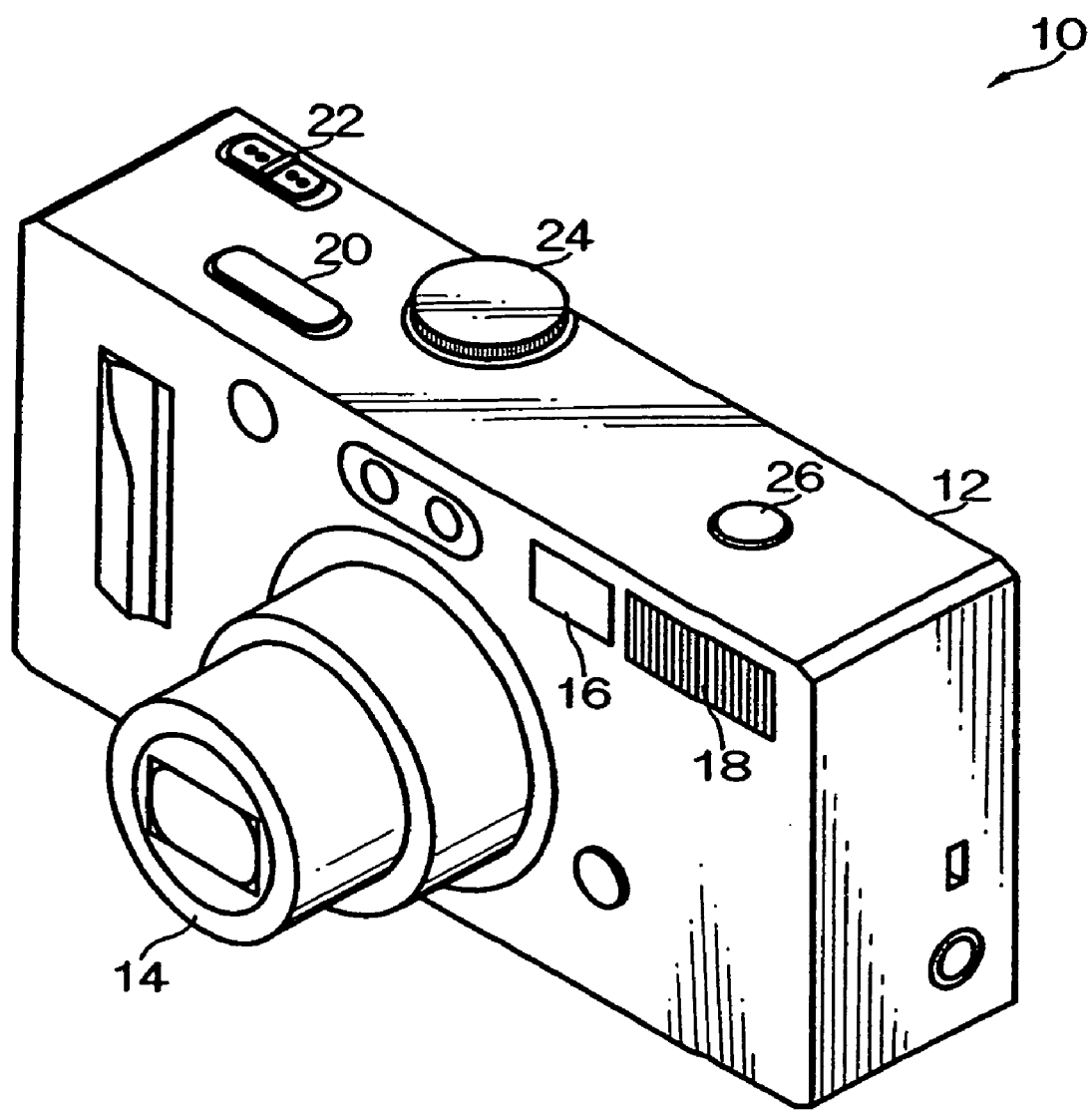
FIG. 1 is a front perspective view of an imaging device.
Figure 2:
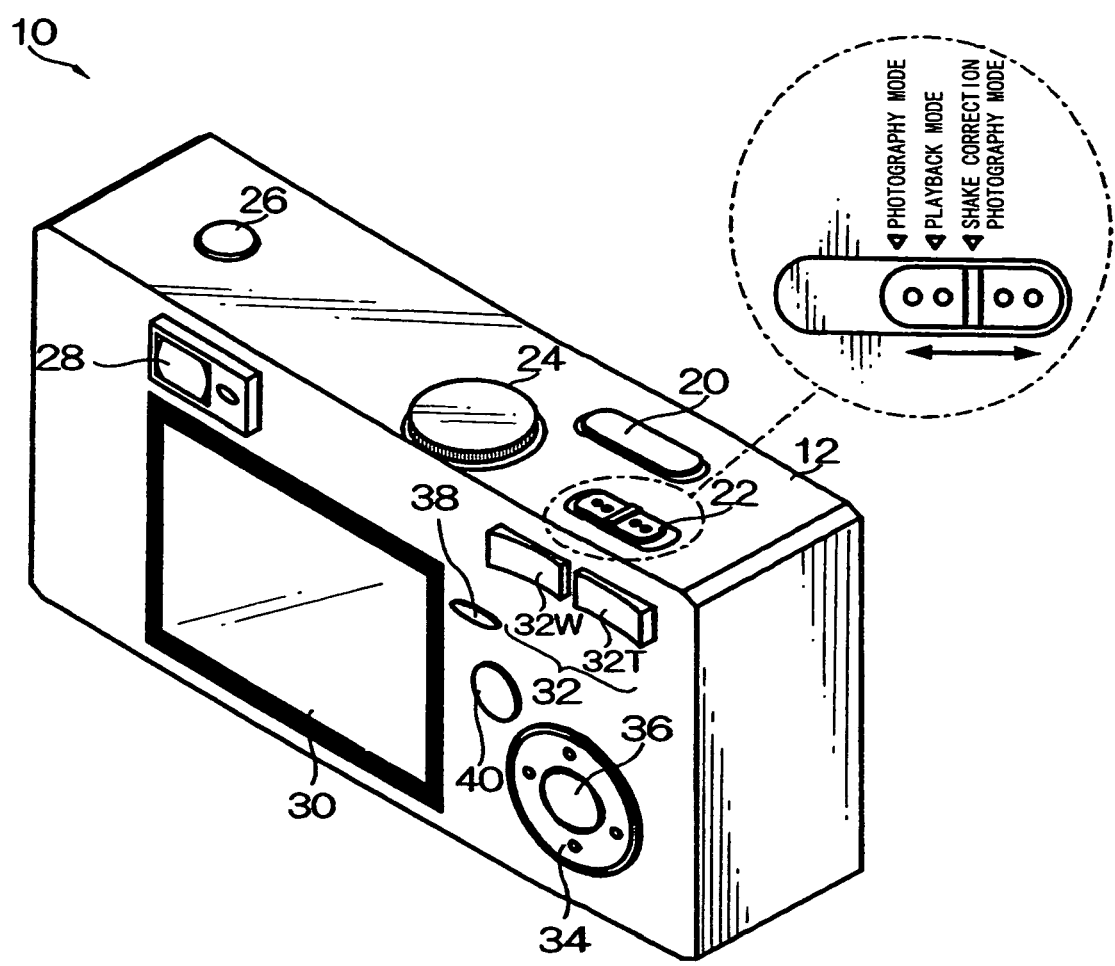
FIG. 2 is a rear perspective view of an imaging device.

FIG. 1 and FIG. 2 are respectively front and rear perspective views showing a first embodiment of an imaging device according to the present invention.

As shown, the imaging device 10 is a digital camera which uses an imaging element to convert an optical image of a subject into electric signals to be recorded as digital data into a storage media, and is equipped with an optical shake correction function.

A device main body 12 of the imaging device 10 is formed in a shape of a rectangular box that is elongated in a transverse direction, and a front face thereof is provided with a photographic lens 14, a finder window 16, a flash 18 and the like, as shown in FIG. 1. In addition, a top face of the device main body 12 is provided with a shutter button 20, a mode switch 22, a mode dial 24, a power button 26 and the like, while a rear face thereof is provided with a finder eyepiece 28, a liquid crystal monitor 30, a zoom button 32, an arrow key 34, a MENU/OK button 36, a DISP button 38, a BACK button 40 and the like, as shown in FIG. 2.

The shutter button 20 is composed of a two stage stroke switch consisting of so-called "halfway-pressing" and "fully-pressing". Halfway-pressing the shutter button 20 causes the imaging device 10 to perform AE (Automatic Exposure), AF (Auto Focus) and AWB (Automatic White Balance), while fully-pressing the shutter button 20 performs image recording.

The mode switch 22 functions as a mode switching device which switches operating modes of the imaging device 10, and is provided to be slidable among a "photography position", a "playback position" and a "shake correction photography position". When the mode switch 22 is moved to the "photography position", the imaging device 10 will be set to a "photography mode" for performing photography with the shake correction function turned off, and when the mode switch 22 is moved to the "playback position", the imaging device 10 will be set to a "playback mode" for performing playback of photographed images. In addition, when the mode switch 22 is moved to the "shake correction photography position", the imaging device 10 will be set to a "shake correction photography mode" for performing photography with the shake correction function turned on.

The mode dial 24 functions as a photography mode setting device which sets photography modes of the imaging device 10, and according to setting positions of the mode dial, the photography mode of the imaging device 10 is set to any of an "automatic photography mode", a "moving image photography mode", a "portrait photography mode", a "sports photography mode", a "scenic photography mode", a "nightscape photography mode", a "program photography mode", an "aperture priority photography mode", a "shutter speed priority photography mode" and a "manual photography mode".

The power button 26 functions as a power switch for turning on/off the power of the imaging device 10, and the on/off state may be alternated by pressing down the power button 26.

The liquid crystal monitor 30 is composed of a liquid crystal display capable of color display. The liquid crystal monitor 30 is used both as a display panel during playback mode for displaying photographed images, as well as a display panel of a user interface when configuring various settings. In addition, live views are displayed as needed during photography, allowing the liquid crystal monitor 30 to be used as an electronic finder for confirming angles of view.

The zoom button 32 is composed of a zoom tele button 32T which instructs zooming towards a telephoto side and a zoom wide button 32W which instructs zooming towards a wide angle side. The photographing angle of view may be changed by operating the zoom button 32.

The arrow key 34 is arranged to be operable by pressing in the four directions of up, down, left and right. Functions assigned to each direction key change according to the state of the camera. For instance, in normal photography mode, the right key functions as a switch for switching on/off a macro function, while the left key functions as a switch for switching flash functions (auto/red-eye reduction/slow synchro/flash prohibited). In addition, as described later, during framing adjustment, the up key functions as a key for inputting instructions for movement in an upward direction in a photographic area, the down key functions as a key for inputting instructions for movement in a downward direction in the photographic area, the right key functions as a key for inputting instructions for movement in a rightward direction in the photographic area, and the left key functions as a key for inputting instructions for movement in a leftward direction in the photographic area. Furthermore, during playback, the right key functions as a forward frame advance button, while the left key functions as a reverse frame advance button.

The MENU/OK button 36 functions as a button for instructing transition from the normal screen of each mode to a menu screen (MENU button), and a button for instructing finalization of selected contents and execution of processing or the like (OK button).

The DISP button 38 functions as a button for issuing instructions for switching displayed contents of the rear face display panel, while the BACK button 40 functions as a button for issuing instructions to cancel input operations or the like.

Figure 3:
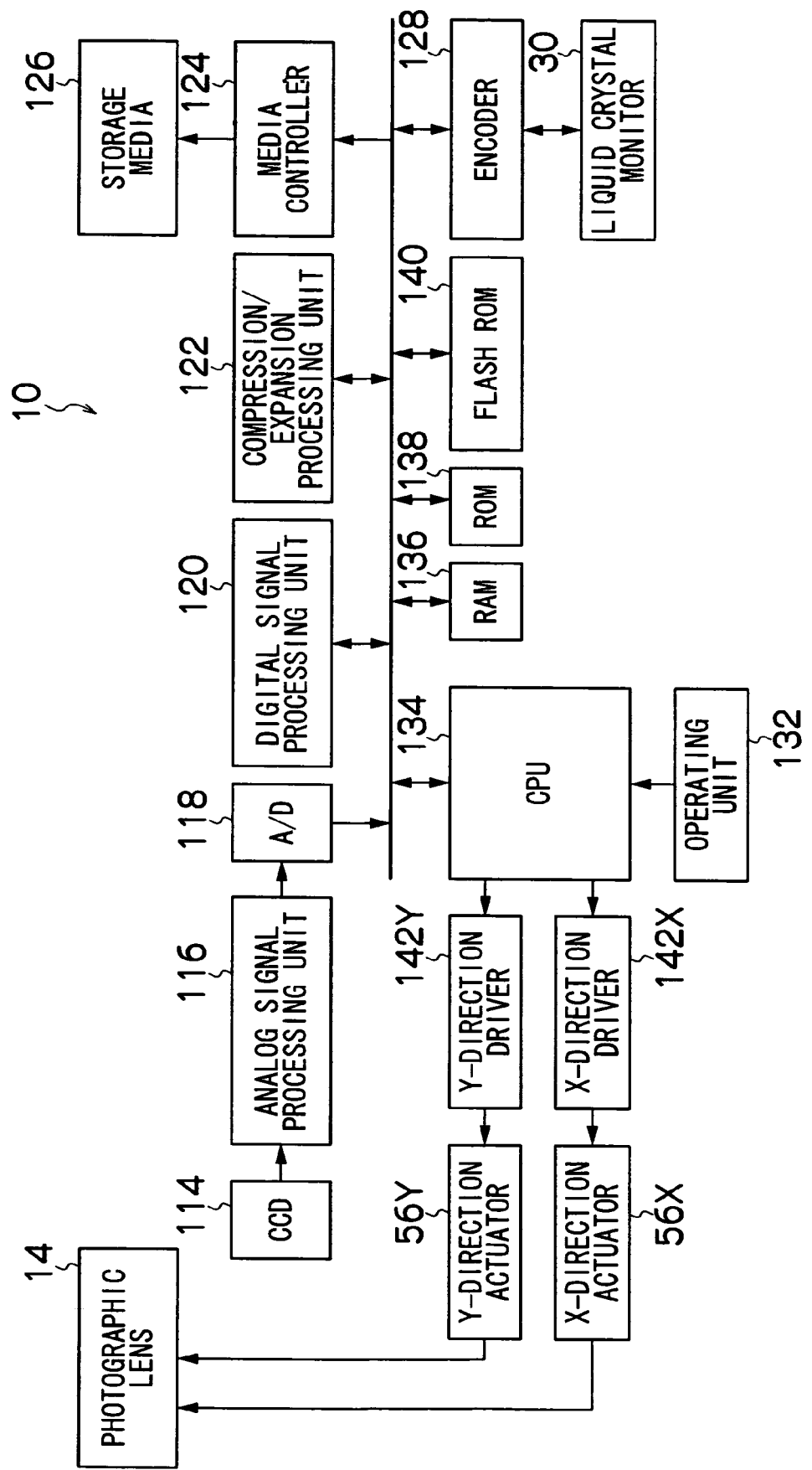
FIG. 3 is a block diagram showing an electrical configuration of an imaging device.

FIG. 3 is a block diagram showing an electrical configuration of the above-described imaging device. As shown in FIG. 3, the imaging device 10 is composed of the photographing lens 14, an imaging element 114, an analog signal processing unit 116, an A/D converter 118, a digital signal processing unit 120, a compression/expansion processing circuit 122, a media controller 124, a storage medium 126, an encoder 128, the liquid crystal monitor 30, an operating unit (the shutter button 20, the mode switch 22, the mode dial 24, the shake correction function switching switch 26, the zoom button 32, the arrow key 34, the MENU/OK button 36, the DISP button 38, the BACK button 40 and the like) 132, a CPU 134, a RAM 136, a ROM 138, a flash ROM 140 and the like.

Overall operations of the imaging device 10 are comprehensively controlled by the CPU 134. In response to input from the operating unit 132, the CPU 134 uses the RAM 136 as a work area to control various sections of the imaging device 10 according to predetermined control programs. The ROM 138 stores control programs executed by the CPU 134 and various data necessary for control, while the flash ROM 140 stores user setting data and the like.

The imaging element 114 is composed of, for instance, a primary color CCD. Light incident to the acceptance surface of the imaging element 114 via the photographic lens 14 is photo-electrically converted by photodiodes arranged on the acceptance surface of the imaging element 114, and is outputted from the imaging element 114 as an image signal.

Predetermined signal processing is performed on the image signals outputted from the imaging element 114 by the analog signal processing unit 116 comprising a CDS (correlated double sampling) circuitry, an AGC (gain control amplifier circuit) and the like. The A/D converter 118 converts the processed signals into digital signals, which are then loaded onto the digital signal processing unit 120.

The digital signal processing unit 120 performs predetermined signal processing such as color separation processing, gamma correction processing, contour enhancement/correction processing and color-difference matrix processing on the inputted image signals to generate YUV signals consisting of luminance signals (Y signals) and color-difference signals (Cr, Cb signals).

When recording images, predetermined compression processing is performed at the compression/expansion processing unit 122 on YUV signals generated by the digital signal processing unit 120. The compressed image data is recorded onto the storage medium 126 via the media controller 124.

When displaying live views on the liquid crystal monitor 30, YUV signals generated by the digital signal processing unit 120 are applied to the encoder 128 to be converted into a predetermined display signal format and outputted to the liquid crystal monitor 30.

For playback of compressed image data recorded in the storage medium 126, the compressed image data is read out to the compression/expansion processing unit 122 in response to a playback operation by the user to receive predetermined expansion processing to become uncompressed YC signals, which are then displayed on the liquid crystal monitor 30 via the encoder 128.

Figure 4:
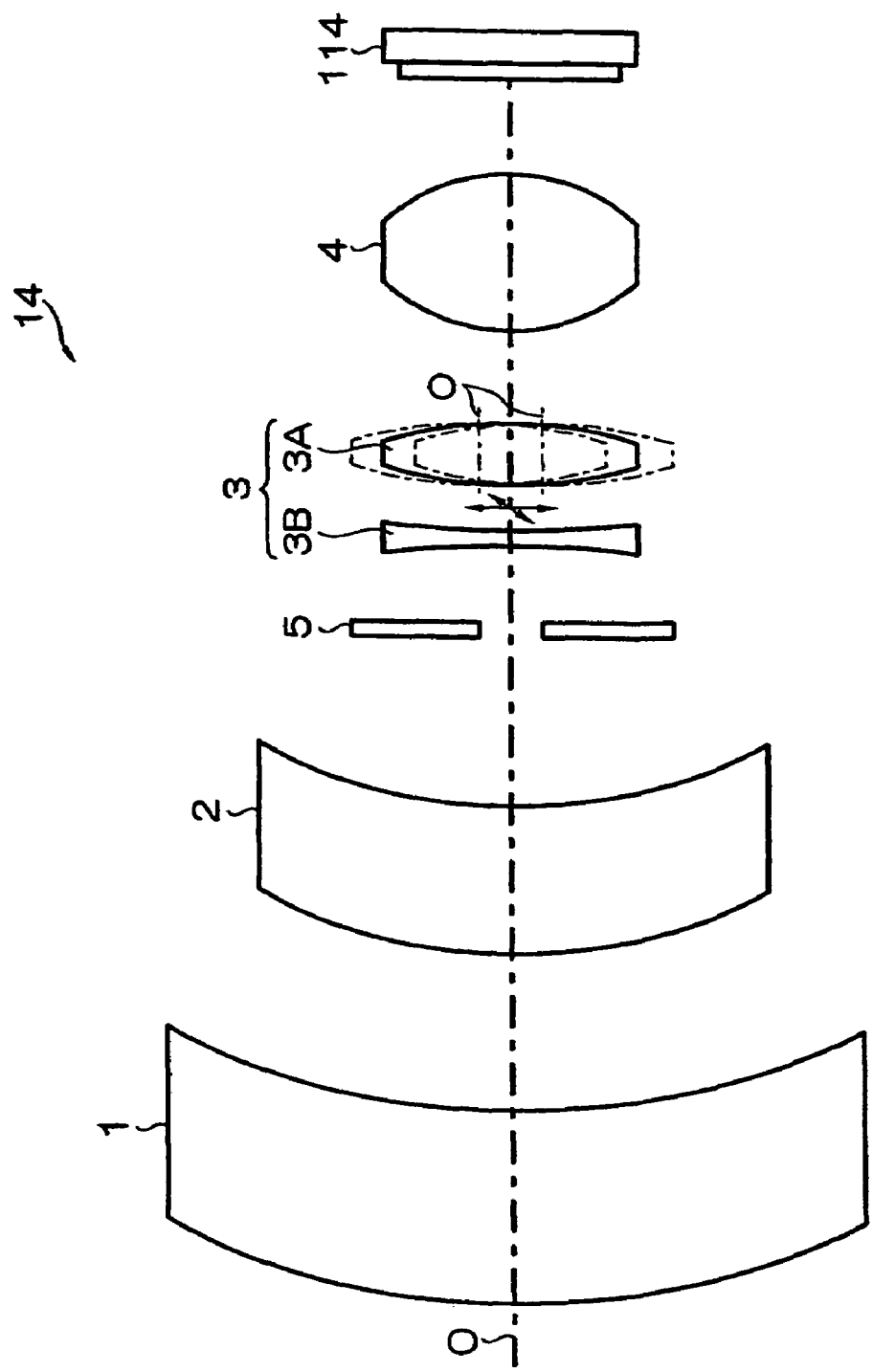
FIG. 4 is a diagram showing a general configuration of a photographic lens.

FIG. 4 is a diagram showing a general configuration of the photographic lens. As shown, the photographic lens 14 is composed of a first lens group 1, a second lens group 2, a third lens group 3 and a fourth lens group 4. An aperture 5 is set in front of the third lens group 3. The photographic lens 14 comprises a shake correction function in which the first lens group 1, the second lens group 2 and the fourth lens group 4 constitute an imaging optics system, while the third lens group 3 constitutes a shake correction optics system which corrects image shake of the image optics system.

The third lens group 3 which constitutes the shake correction optics system is composed of a correction lens 3A and a fixed lens 3B. Image shake is corrected by moving the correction lens 3A in a pitch direction (upward and downward) and in a yaw direction (leftward and rightward) within a plane that is perpendicular to a photographic optical axis O.

Figure 5:
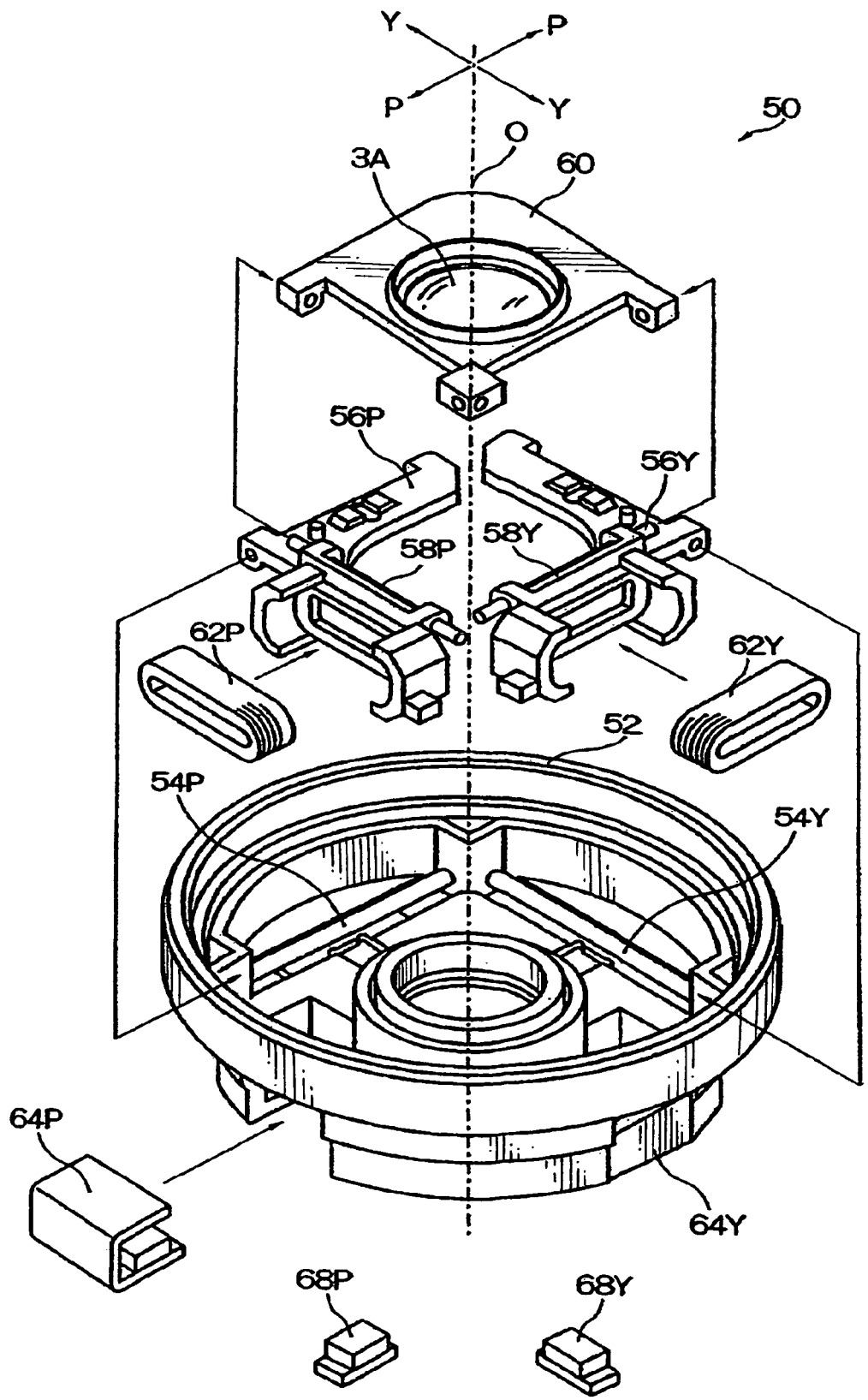
FIG. 5 is an exploded perspective view of a configuration of a shake correction device.

FIG. 5 is an exploded perspective view of a configuration of a lens drive mechanism of the shake correction optics system. As shown, a P guide shaft 54P oriented in the pitch direction (direction P in the drawing) and a Y guide shaft 54Y oriented in the yaw direction (direction Y in the drawing) are allocated inside a lens body tube 52.

A P slider 56P is slidably supported on the P guide shaft 54P, while a Y slider 56Y is slidably supported on the Y guide shaft 54Y. A y guide shaft 58Y is allocated along the Y direction on the P slider 56P, and a lens retaining frame 60 retaining the correction lens 3A is slidably supported on the y guide shaft 58Y. In addition, a p guide shaft 58P is allocated along the P direction on the Y slider 56Y, and the lens retaining frame 60 is slidably supported on the p guide shaft 58P.

The P slider 56P is driven by a P coil motor 66P consisting of a coil 62P and a magnet 64P, to slide in the P direction. The coil 62P, which composes the P coil motor 66P, is mounted on the P slider 56P, while the magnet 64P is mounted on the lens body tube 52.

On the other hand, the Y slider 56Y is driven by a Y coil motor 66Y consisting of a coil 62Y and a magnet 64Y, to slide in the Y direction. The coil 62Y, which composes the Y coil motor 66Y, is mounted on the Y slider 56Y, while the magnet 64Y is mounted on the lens body tube 52.

In addition, the position of the P slider 56P is detected by a P position sensor 70P consisting of a Hall element (not shown) and a magnet 68P. The Hall element which composes the P position sensor 70P is mounted on the P slider 56P, while the magnet 64P is mounted on the lens body tube 52.

On the other hand, the position of the Y slider 56Y is detected by a Y position sensor 70Y consisting of a Hall element (not shown) and a magnet 68Y. The Hall element which composes the Y position sensor 70Y is mounted on the Y slider 56Y, while the magnet 68Y is mounted on the lens body tube 52.

The lens drive mechanism of the shake correction optics system is configured as described above. According to this lens drive mechanism, when the P coil drive motor 66P is driven, the slider 56P moves in the P direction, causing the lens retaining frame 60 to move in the P direction which in turn moves the correction lens 3A in the P direction. In addition, when the Y coil drive motor 66Y is driven, the slider 56Y moves in the Y direction, causing the lens retaining frame 60 to move in the Y direction, in turn moving the correction lens 3A in the Y direction.

Upon detection of movement of the P slider 56P by the P position sensor 70P, the CPU 34 drives the P coil motor 66P via a P coil motor driver 72P and moves the correction lens 3A so as to cancel out the movement of the P slider 56P. In addition, upon detection of movement of the Y slider 56Y by the Y position sensor 70Y, the Y coil motor 66Y is driven via a Y coil motor driver 72Y to move the correction lens 3A so as to cancel out the movement of the Y slider 56Y. Image shake due to camera shake is hereby corrected.

As described above, with the imaging device 10 according to the present embodiment, the shake correction function may be switched on/off by switching operations using the mode switch 22. In other words, by setting the mode switch 22 to the "photography position", the "photography mode" will be set and photography will be performed with the shake correction function turned off. When the mode switch 22 is moved to the "shake correction photography position", the "shake correction photography mode" will be set and photography will be performed with the shake correction function turned on.

When the mode switch 22 is switched and the shake correction photography mode changes over to the photography mode, the shake correction function is turned off, and driving of the correction lens 3A of the shake correction optic system, on which movement control has been heretofore performed, is released and the correction lens 3A returns to origin, or in other words, moves onto the photographic optical axis (centering). During centering, if a live view is being displayed on the liquid crystal monitor 30, image shake will occur and the image will lose its continuity, which in turn will discomfort a photographer.

In consideration of the above, when switching operating modes of the imaging device 10 of the present embodiment using the mode switch 22, the display on the liquid crystal monitor 30 is temporarily turned off, or in other words, the liquid crystal monitor 30 is blacked out. Centering operations are arranged to be performed during this black out in order to prevent occurrences of image shake which discomfort photographers.

Figure 6:
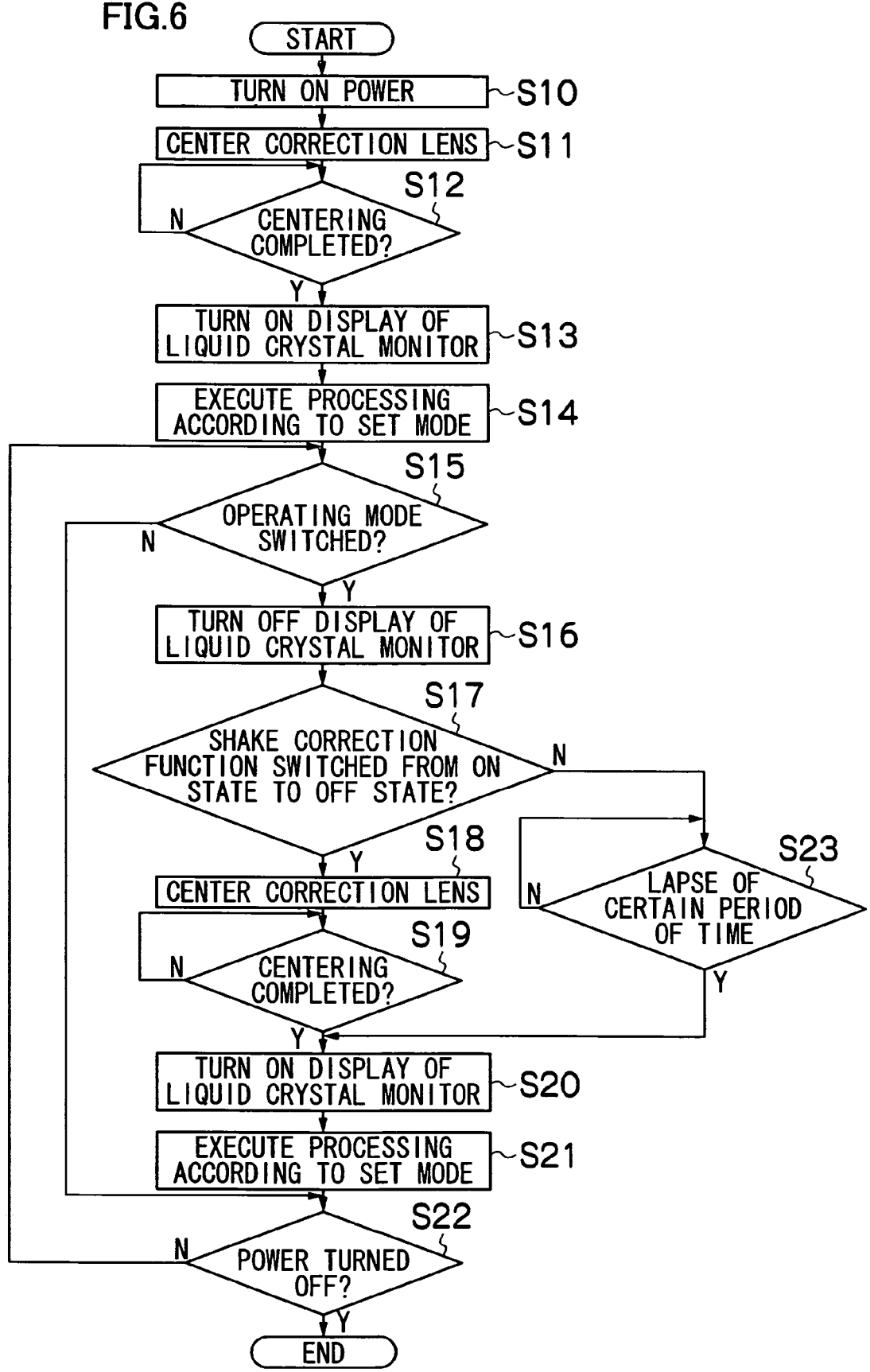
FIG. 6 is a flowchart showing a sequence of operations in an imaging device according to a first embodiment.

FIG. 6 is a flowchart showing a sequence of operations of the imaging device 10 according to the present embodiment.

As shown, when the power button 26 is pressed and power is turned on (step S10), the CPU 34 controls driving of the P coil motor 66P and the Y coil motor 66Y to center the correction lens 3A (step S11). After confirming that centering of the correction lens 3A is completed (step S12), the CPU 34 turns on the display of the liquid crystal monitor 30 (step S13) to execute processing according to the set operating mode (step S14). In other words, playback control is performed when the mode switch 22 is set to the playback position (playback mode), while photography control is performed when the mode switch 22 is set to the photography position (photography mode). In addition, when the mode switch 22 is set to the shake correction photography position (shake correction photography mode), the CPU 34 performs photography control while simultaneously performing shake correction control.

Next, determination is made on whether the mode switch 22 has been operated and the operating mode has been switched over (step S15). If it is determined that the operating mode has been switched over, the display on the liquid crystal monitor 30 is turned off and blacked out (step S16).

Subsequently, the CPU 34 determines whether the shake correction function has been switched from its on state to its off state (step S17). In other words, determination is made on whether the switching of operating modes is a switching from the shake correction photography mode to another mode (playback mode or photography mode).

If it is determined that the switching is from the shake correction mode to another mode, the CPU 34 controls driving of the P coil motor 66P and the Y coil motor 66Y to center the correction lens 3A (step S18). After confirming that centering of the correction lens 3A is completed (step S19), the CPU 34 turns on the display of the liquid crystal monitor 30 (step S20) to execute processing according to the set operating mode (step S21).

On the other hand, if it is determined that the switching is not from a shake correction mode to another mode, the CPU 34 waits for a lapse of a predetermined period of time (step S23), and turns on the display of the liquid crystal monitor 30 (step S20). Processing according to the set operating mode is then executed (step S21).

Subsequently, the CPU 34 determines whether power of the imaging device 10 has been turned off (step S22), and if so, terminates the routine. On the other hand, if it is determined that power has not been turned off, the routine returns to step S15 to repeatedly execute the above-described processing.

As described above, according to the imaging device 10 of the present embodiment, the display of the liquid crystal monitor 30 temporarily blacks out when operating modes of the imaging device 10 is switched over by the mode switch 22, and if necessary, centering of the correction lens 3A is performed during the black out. This prevents discomfort to the photographer even when displaying a live view on the liquid crystal monitor 30. In other words, by arranging the display on the liquid crystal monitor 30 to black out in conjunction with switching operations of the mode switch 22 instead of simply having the liquid crystal monitor 30 black out, the present embodiment may effectively prevent photographers from feeling discomfort.

While the present embodiment is arranged so that the display of the liquid crystal monitor 30 is blacked out even in cases other than turning off the shake correction function, or in other words, even in cases other than switching from the shake correction photography mode to another mode, the display of the liquid crystal monitor 30 may be arranged to black out only when turning off the shake correction function, or in other words, only when switching over from the shake correction photography mode to another mode.

In addition, when turning off the shake correction function, while the present embodiment is arranged so that the display of the liquid crystal monitor 30 is turned on after confirming conclusion of centering of the correction lens 3A, the embodiment may alternatively be arranged to set a certain period of time and to center the correction lens 3A during the period of time. In other words, the embodiment may be arranged to set in advance a period of time necessary and sufficient for centering, and to switch the display of the liquid crystal monitor 30 to a live view after the period of time has lapsed.

Furthermore, in the present embodiment, while switching of the operating modes by the mode switch 22 is limited to three modes, switching of the operating modes by the mode switch 22 need not be limited to this example. For instance, besides the modes exemplified above, the embodiment may be arranged so that setting and switching to a moving image photography mode, a shake correction moving image photography mode or the like may be performed.

Switching of operating modes by the mode switch 22 should preferably be made to at least three modes in order to further reduce discomfort caused by black out.

Moreover, the arrangement of the operating modes to be switched by the mode switch 22 need not be limited to the arrangement used in the present embodiment, and switching may be performed on other arrangements. For instance, operating modes may be arranged in a sequence of "playback position", "photography position" and "shake correction photography position", or in a sequence of "shake correction photography position", "playback position" and "photography position".

In addition, while the present embodiment is arranged so that switching of the operating modes of the imaging device 10 is performed using a sliding mode switch 22, devices for switching operating modes need not be limited to this example. For instance, a dial-type mode switch may alternatively be used for switching operating modes. In addition, a button-type mode switch may alternatively be used for switching operating modes. In this case, the mode switch is configured so that the operating mode of the imaging device 10 is switched each time the mode switch is pressed.

Furthermore, while the present embodiment has been arranged so that the display of the liquid crystal monitor 30 blacks out every time the operating mode is switched by the mode switch, a predetermined image may be displayed instead.

Next, a second embodiment of an imaging device according to the present invention will be described.

With the imaging device 10 of the above-described first embodiment, when switching operating modes of an imaging device 10 of the present embodiment using a mode switch 22, the display on the liquid crystal monitor 30 is temporarily turned off, and centering operations of the correction lens 3A are performed during this black out to prevent image shake from discomforting photographers.

An imaging device 100 of the second embodiment is configured to switch on/off a shake correction function using the liquid crystal monitor 30 in order to prevent image shake from discomforting photographers during centering operations of the correction lens 3A. In other words, the imaging device 100 of the second embodiment is configured so that a configuration screen is displayed on the liquid crystal monitor 30 when switching the on/off state of the shake correction function, and the shake correction function is switched on/off at the configuration screen. By arranging the configuration so that, when the shake correction function is switched off, the configuration screen returns to a live view after centering is completed, image shake due to centering may be prevented from discomforting photographers.

Figure 7:
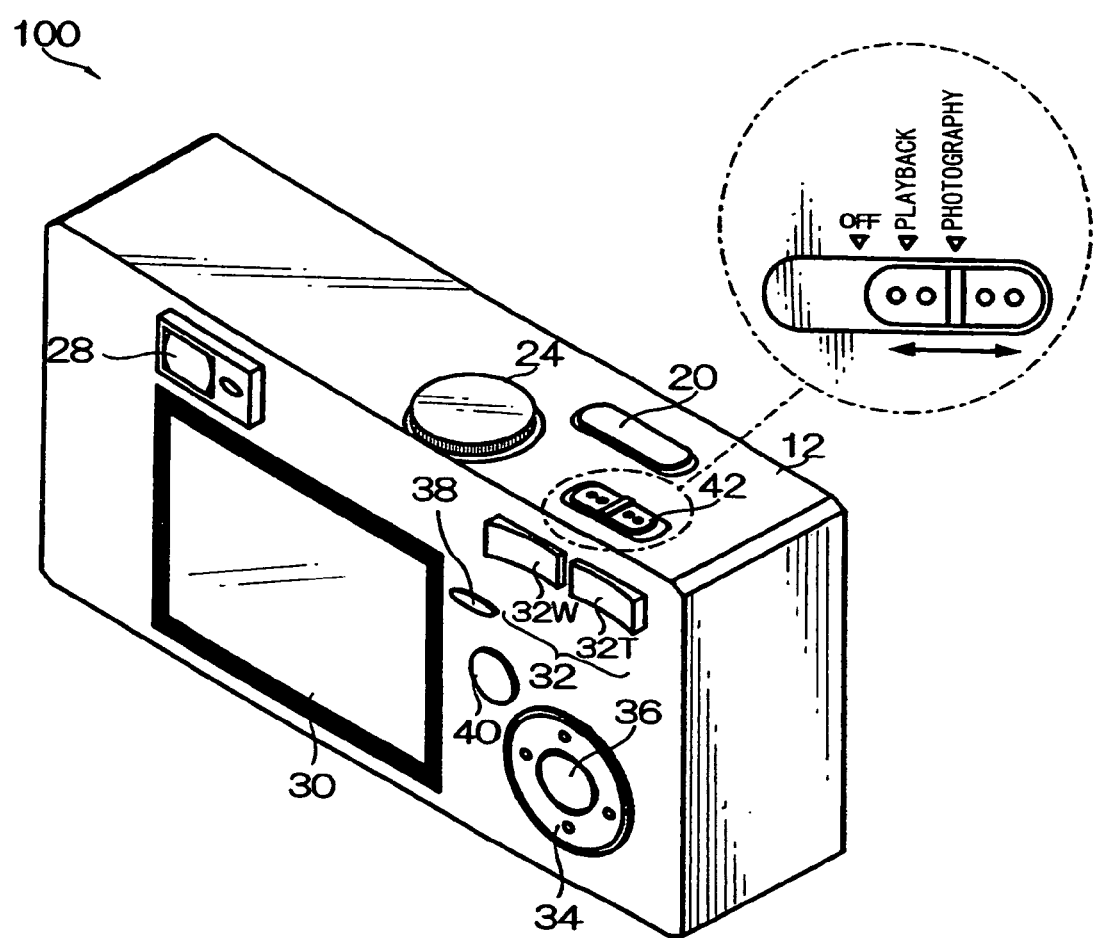
FIG. 7 is a rear perspective view of an imaging device according to a second embodiment.

FIG. 7 is a rear perspective view of the imaging device 100 according to the present embodiment. Like components to the imaging device 10 of the first embodiment are assigned like reference numerals.

As shown, the imaging device 100 of the second embodiment differs from the imaging device 10 of the first embodiment in the way a mode switch 42 is configured. In other words, in the imaging device 100 of the second embodiment, the mode switch 42 doubles as a power switch, and is provided to be slidable among an "off position", a "playback position" and a "photography position". The imaging device 100 is turned off by setting the mode switch 42 to the "off position", and is turned on by setting the mode switch 42 to the "playback position" or the "photography position". When the mode switch 42 is set to the "playback position", a playback mode is set, and when the mode switch 42 is set to the "photography position", a photography mode is set.

Figure 8A:
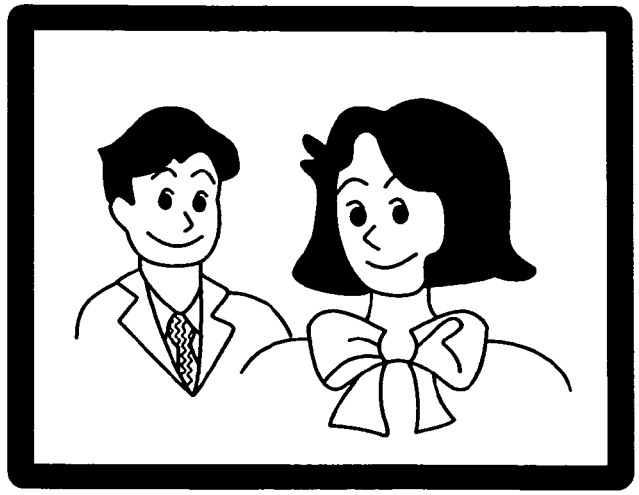
FIGS. 8A to 8C are diagrams showing a display example of a liquid crystal monitor.

As described above, with the imaging device 100 of the present embodiment, the shake correction function is switched on/off on a configuration screen displayed on the liquid crystal monitor 30. In other words, as shown in FIGS. 8A to 8C, when the MENU/OK button 36 is pressed when the operating mode of the imaging device 100 is set to the photography mode, the display of the liquid crystal monitor 30 is switched from a live view (FIG. 8A) to a photography menu (FIG. 8B), and the on/off state of the shake correction function is set on the photography menu.

Figure 8B:
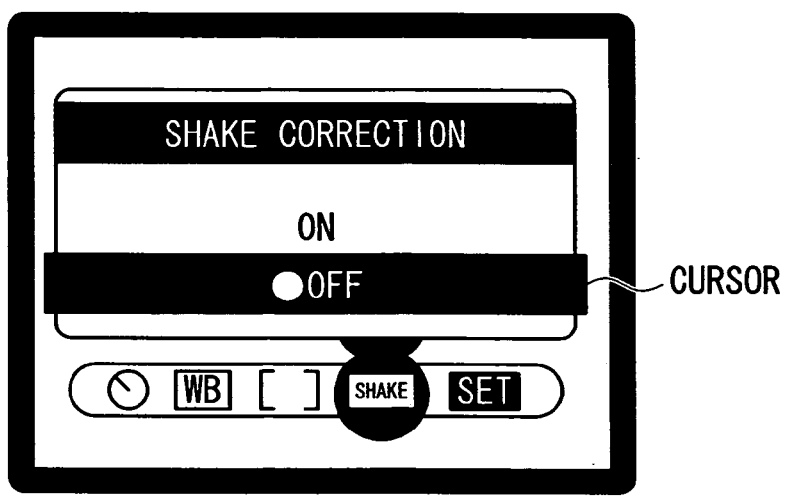

In the example shown in FIG. 8B, the MENU/OK button 36 is pressed to display a list of various items configurable as photography menus. An item for switching on/off the shake correction function is selected from the displayed list of items to set the on/off state of the shake correction function. Selection of menu items or the on/off state of the shake correction function is performed by using the arrow key 34 to move a cursor, while selected items may be finalized by pressing the MENU/OK button 36.

Figure 8C:
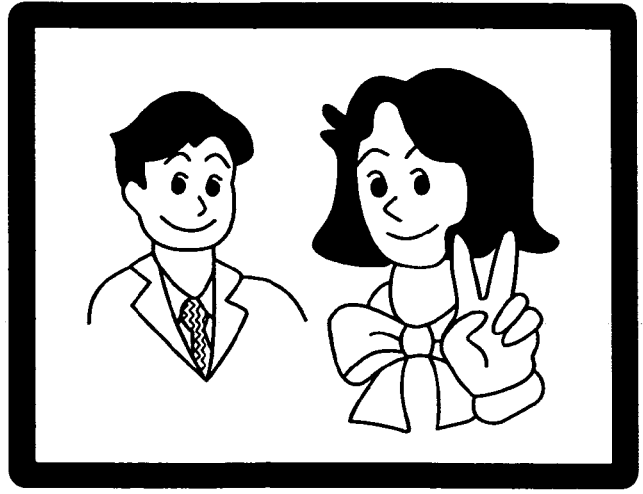

When the MENU/OK button 36 is pressed to conclude setting and input of the on/off state of the shake correction function, the CPU 34 performs predetermined operations to switch the display on the liquid crystal monitor 30 from the configuration menu (FIG. 8B) to a live view (FIG. 8C). In other words, when the shake correction function is turned off, the correction lens 3A is centered, and after centering is completed, the display on the liquid crystal monitor 30 is switched from the menu screen to a live view. On the other hand, when the shake correction function is turned on, shake correction control is commenced and the display on the liquid crystal monitor 30 is switched from the menu screen to a live view.

Since the electrical configuration of the imaging device 100 is basically the same as that of the above-described imaging device 10 of the first embodiment, a description thereof will be omitted.

Figure 9:
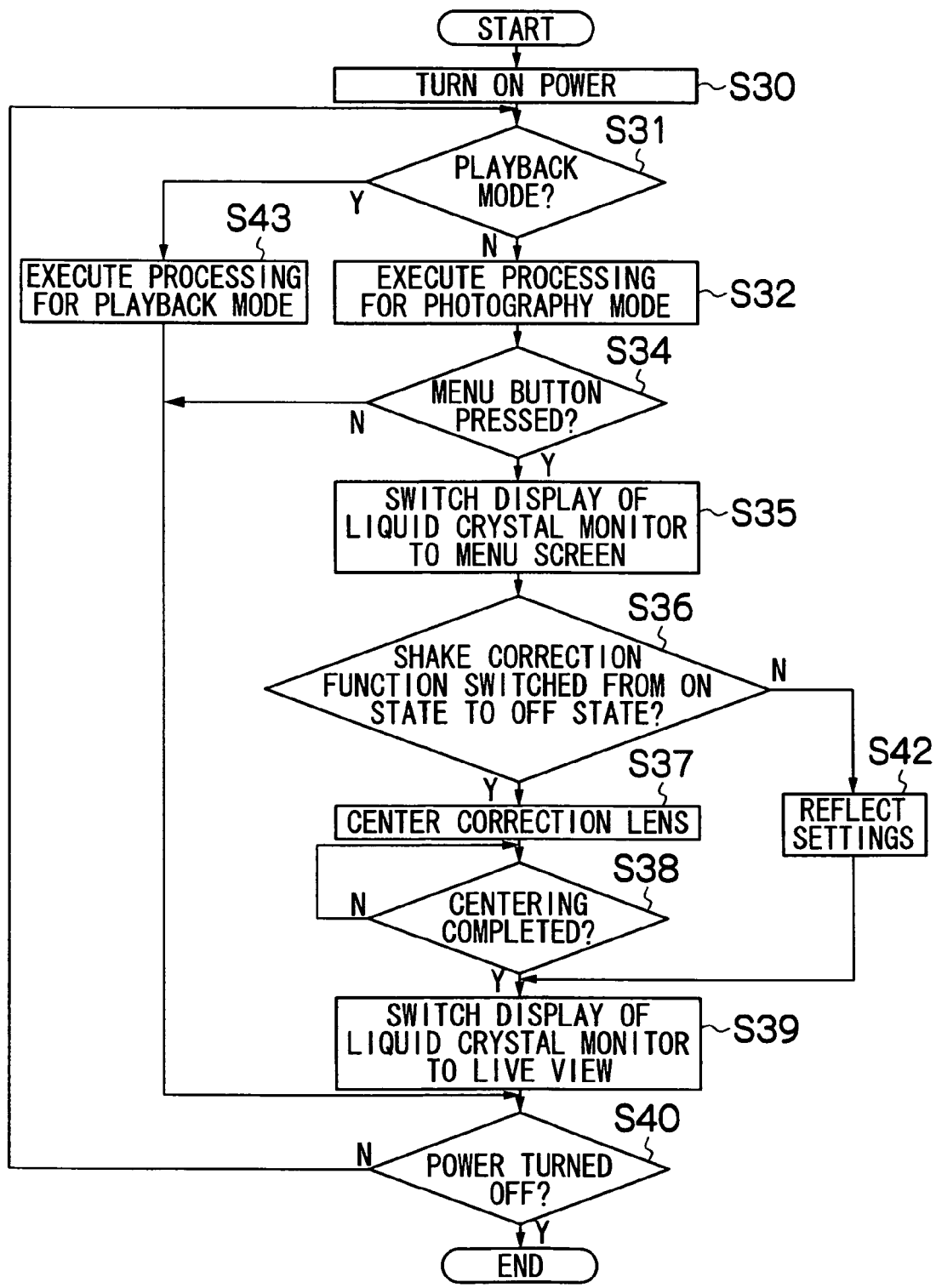
FIG. 9 is a flowchart showing a sequence of operations in an imaging device according to the second embodiment.

FIG. 9 is a flowchart showing a sequence of operations by the imaging device 100 according to the second embodiment.

As shown, when the power button 26 is pressed and power is turned on (step S30), the CPU 34 determines whether the operating mode of the imaging device 100 is set to playback mode (step S31).

When the mode switch 22 is set to the playback position and the CPU 34 determines that the playback mode is set as the operating mode, the CPU 34 executes playback control (step S43).

On the other hand, when the mode switch 22 is set to the photography position and the CPU 34 determines that the photography mode is set as the operating mode, the CPU 34 executes photography control (step S32). In this case, the CPU 34 first performs centering of the correction lens 3A, and after centering, turns on the display of the liquid crystal monitor 30 to display a live view thereon. The CPU 34 subsequently performs shake correction control according to settings of the shake control function, and performs photography control. In other words, when the shake correction control is turned on, the CPU 34 performs photography control while performing shake correction control, and when the shake correction control is turned off, the CPU 34 performs photography control without performing shake correction control.

As for settings regarding the on/off state of the shake correction function upon power-on, it is assumed that the settings at the time of last termination will be inherited. Therefore, the shake correction function will be turned on if it had been set to its on state upon its last termination, while the shake correction function will be turned off if it had been set to its off state upon its last termination.

As seen, after power-on, the CPU 24 performs photography control according to set states. During the process of performing photography control, the CPU 34 determines whether the MENU/OK button 36 has been pressed (step S34). In other words, determination is made on whether a menu screen has been called on to the liquid crystal monitor 30.

If it is determined that the MENU/OK button 36 has been pressed, the CPU 34 switches the display on the liquid crystal monitor 30 to the menu screen, as shown in FIG. 8B (step S35). A photographer performs various settings using the menu screen displayed on the liquid crystal monitor 30.

The CPU 34 determines whether the shake correction function has been turned off based on settings inputted from the photographer (step S36). If it is determined that the shake correction function is not turned off, processing reflecting the inputted settings is executed (step S42). For instance, if a self timer has been set, self timer processing is executed. If setting of white balance has been performed, adjustment processing of the set white balance is performed. The display of the liquid crystal monitor 30 is then switched from the menu screen to a live view (step S39) to return to photography control. Subsequently, the CPU 34 determines whether power has been turned off (step S40), and if so, terminates the routine. On the other hand, if it is determined that power has not been turned off, the routine returns to step S31 to repeatedly execute the above-described processing.

Meanwhile, if it is determined in step S36 that the shake correction function has been turned off, the CPU 34 controls driving of the P coil motor 66P and the Y coil motor 66Y to center the correction lens 3A (step S37). After confirming that centering of the correction lens 3A has been completed (step S38), the display of the liquid crystal monitor 30 is switched from the menu screen to a live view (step S39) to return to photography control.

Subsequently, the CPU 34 determines whether power has been turned off (step S40), and if so, terminates the routine. On the other hand, if it is determined that power has not been turned off, the routine returns to step S31 to repeatedly execute the above-described processing.

As described above, according to the imaging device 100 of the present embodiment, the on/off state of the shake correction function is set on a menu screen, and the display of the liquid crystal monitor 30 is switched to a live view after conclusion of centering of the correction lens 3A when the shake correction function is set to the off state, effectively preventing photographers from feeling discomfort.

In the present embodiment, while an item for setting the on/off state of the shake correction function has been provided as a photography menu, a dedicated button which exclusively sets shake correction functions may be provided on the device main body 12. In this case, a configuration screen for switching of the on/off state of the shake correction function will be displayed on the liquid crystal monitor 30 by pressing the dedicated button to allow setting of an on/off state of the shake correction function.

In addition, when turning off the shake correction function, while the present embodiment is arranged so that the display of the liquid crystal monitor 30 is switched to a live view after confirming conclusion of centering of the correction lens 3A, the embodiment may alternatively be arranged to set a certain period of time and to center the correction lens 3A during the period of time. In other words, the embodiment may be arranged to set in advance a period of time necessary and sufficient for centering, and to switch the display of the liquid crystal monitor 30 to the live view after the period of time has lapsed.

Furthermore, while the present embodiment is configured so that the settings regarding the on/off state of the shake correction function upon last termination will be inherited upon power-on, the embodiment may be arranged so that the shake correction function is automatically set to either an on state or an off state whenever powered up.

Next, a third embodiment of an imaging device according to the present invention will be described.

With the imaging device 10 of the above-described first embodiment, when switching operating modes of the imaging device 10 of the present embodiment using a mode switch 22, the display on the liquid crystal monitor 30 is temporarily turned off, and centering operations of the correction lens 3A are arranged to be performed during this black out in order to prevent image shake from discomforting photographers.

With the imaging device 200 of the third embodiment, when switching the on/off state of the shake correction function, a predetermined image is temporarily displayed on the liquid crystal monitor 30, and centering operations of the correction lens 3A are arranged to be performed while the image is displayed in order to prevent image shake from discomforting photographers.

Figure 10:
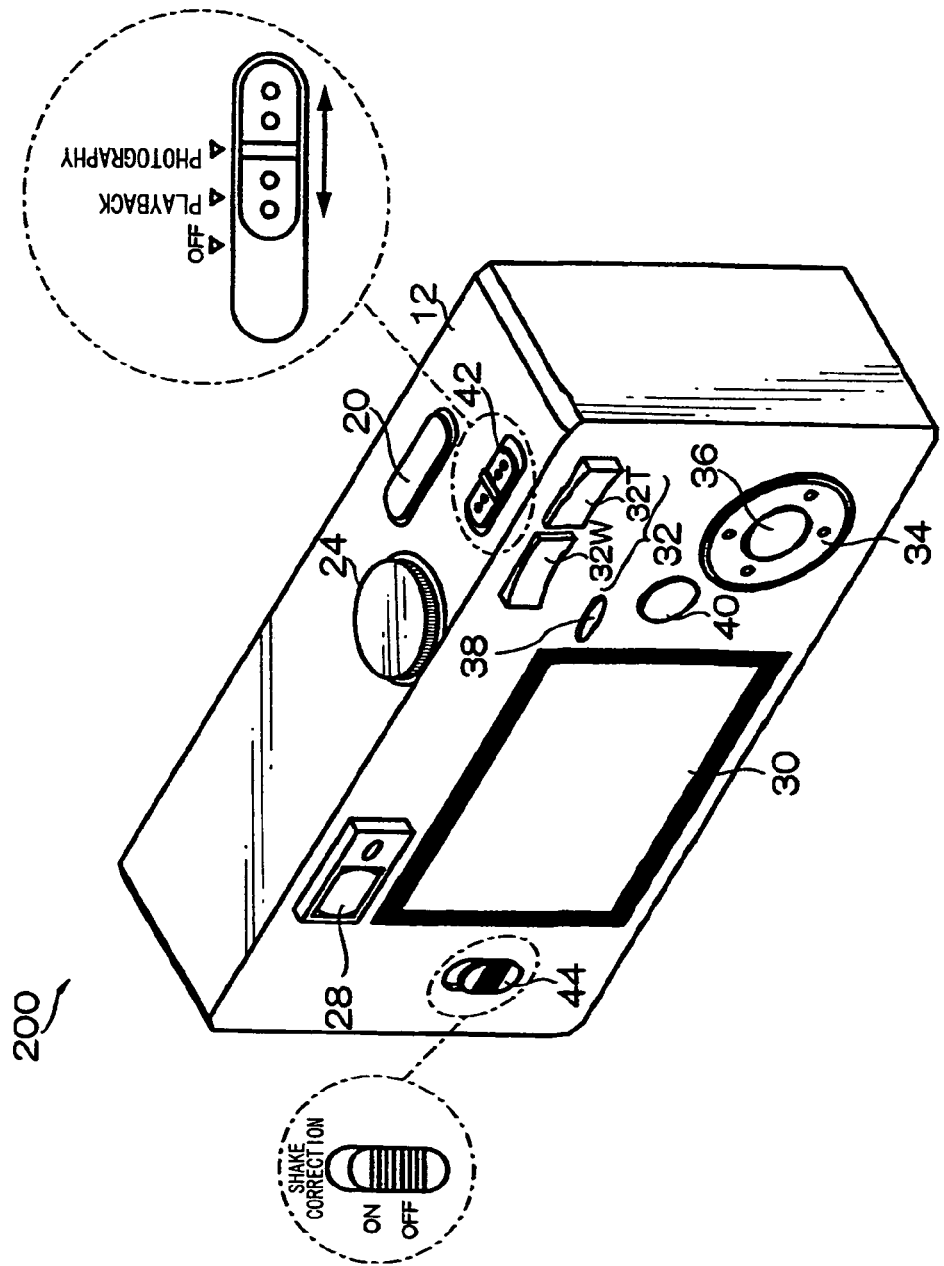
FIG. 10 is a rear perspective view of an imaging device according to a third embodiment.

FIG. 10 is a rear perspective view of the imaging device 200 according to the present embodiment. Like components to the imaging devices of the first and second embodiments are assigned like reference numerals.

As shown, in the imaging device 200 of the third embodiment, the mode switch 42 doubles as a power switch, similar to the imaging device 100 of the second embodiment. In addition, a shake correction switch 44 which sets the on/off state of the shake correction function is provided on the rear face of the device main body 12. The shake correction switch 44 is provided so as to be slidable between an "on position" and an "off position". When set to the "on position", the shake correction function is turned on, and when set to the "off position", the shake correction function is turned off.

Since the electrical configuration of the imaging device 200 is basically the same as that of the above-described imaging device 10 of the first embodiment, a description thereof will be omitted.

Figure 11:
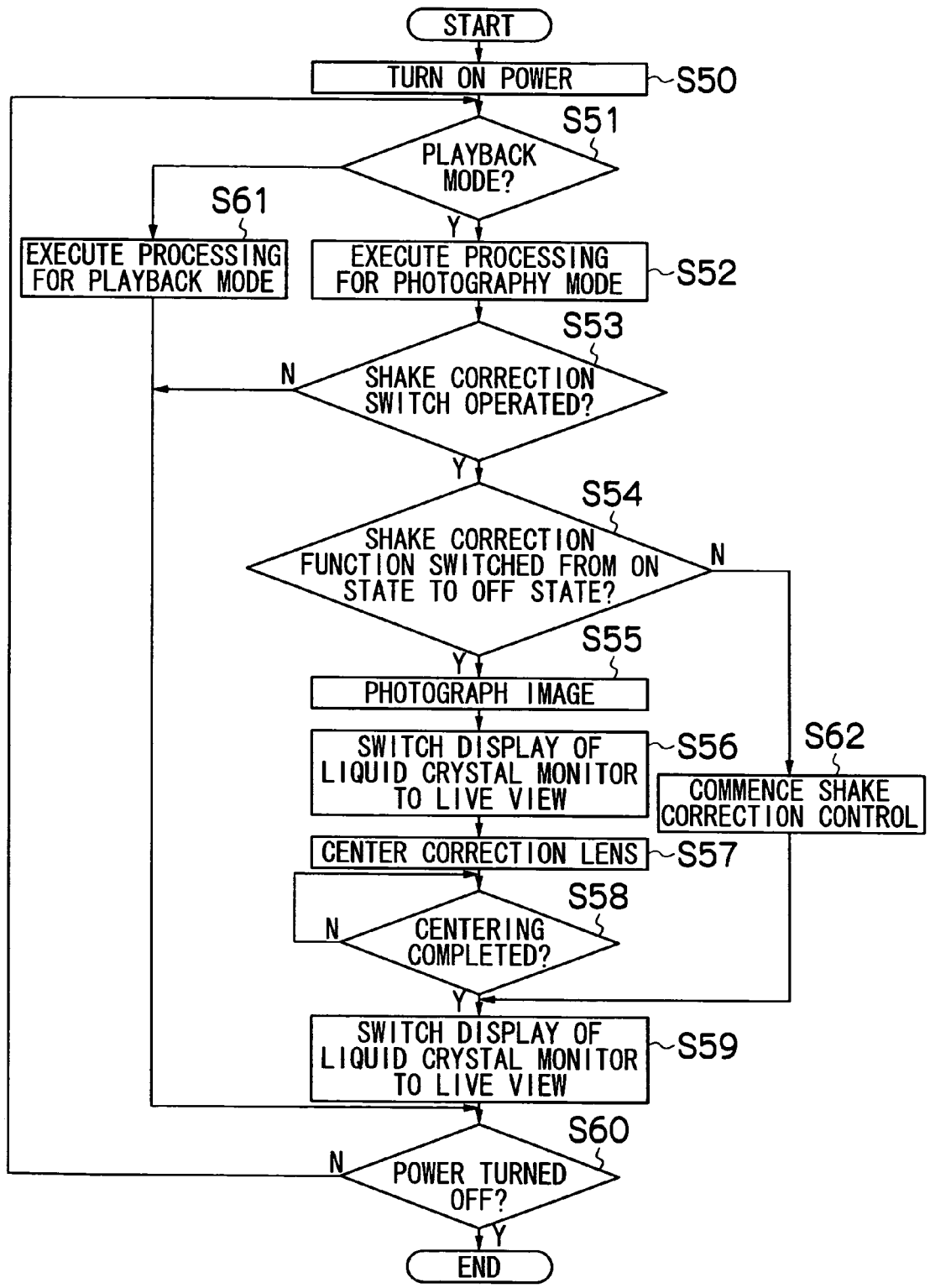
FIG. 11 is a flowchart showing a sequence of operations in an imaging device according to the third embodiment.

FIG. 11 is a flowchart showing a sequence of operations in the imaging device 200 according to the third embodiment.

As shown, when the power button 26 is pressed and power is turned on (step S50), the CPU 34 determines whether the operating mode of the imaging device 200 is set to playback mode (step S51).

When the mode switch 22 is set to the playback position and the CPU 34 determines that the playback mode is set as the operating mode, the CPU 34 executes playback control (step S61).

On the other hand, when the mode switch 22 is set to the photography position and the CPU 34 determines that the photography mode is set as the operating mode, the CPU 34 executes photography control (step S52). In this case, the CPU 34 first controls driving of the P coil motor 66P and the Y coil motor 66Y to center the correction lens 3A, and after centering is completed, turns on the display of the liquid crystal monitor 30. In other words, a live view is displayed on the liquid crystal monitor 30. The CPU 34 subsequently performs shake correction control according to settings of the shake control function, and performs photography control. In other words, when the shake correction control is set to the on state, the CPU 34 performs photography control while performing shake correction control, and when the shake correction control is set to the off state, the CPU 34 performs photography control without performing shake correction control. During the process of performing photography control, the CPU 34 determines whether the shake correction switch 44 has been operated (step S53).

If it is determined that the shake correction switch 44 has been operated, the CPU 34 determines whether the operation is a switching from an on state to an off state of the shake correction function (step S54).

If it is determined that the shake correction switch 44 has been switched from an off state to an on state, the CPU 34 controls driving of the P coil motor 66P and the Y coil motor 66Y based on output from the P position sensor 70P and the Y position sensor 70Y, and commences shake correction control (step S62).

On the other hand, if it is determined that the shake correction switch 44 has been switched from an on state to an off state, the CPU 34 performs photography of an image (step S55). In other words, an image is loaded from the imaging element 114.

The photographed image loaded from the imaging element 114 is playback-displayed on the liquid crystal monitor 30 (step S56).

Subsequently, the CPU 34 controls driving of the P coil motor 66P and the Y coil motor 66Y to center the correction lens 3A (step S57). After confirming that centering of the correction lens 3A has been completed (step S58), the display of the liquid crystal monitor 30 is switched from the menu screen to a live view (step S59) to return to photography control.

Subsequently, the CPU 34 determines whether power has been turned off (step S60), and if so, terminates the routine. On the other hand, if it is determined that power has not been turned off, the routine returns to step S51 to repeatedly execute the above-described processing.

As described above, according to the imaging device 200 of the present embodiment, the on/off state of the shake correction function is set on a menu screen, and the display of the liquid crystal monitor 30 is switched to a live view after conclusion of centering of the correction lens 3A when the shake correction function has been switched off, effectively preventing photographers from feeling discomfort.

In the present embodiment, while an item for setting an on/off state of the shake correction function has been provided as a photography menu, a dedicated button which exclusively sets shake correction functions may be provided on the device main body 12. In this case, a configuration screen for setting the on/off state of the shake correction function will be displayed on the liquid crystal monitor 30 by pressing the dedicated button to allow the on/off state of the shake correction function to be set.

In addition, when turning off the shake correction function, while the present embodiment is arranged so that the display of the liquid crystal monitor 30 is switched to a live view after confirming conclusion of centering of the correction lens 3A, the embodiment may alternatively be arranged to set a certain period of time and to center the correction lens 3A during the period of time. In other words, the embodiment may be arranged to set in advance a period of time necessary and sufficient for centering, and to switch the display of the liquid crystal monitor 30 to the live view after the period of time has lapsed.

As described above, according to the imaging device 200 of the present embodiment, when the shake correction function is turned off, photography of an image is performed and the display of the liquid crystal monitor 30 is switched to the photographed image. Subsequently, the correction lens 3A is centered while the photographed image is displayed, and after centering is completed, the display on the liquid crystal monitor 30 is switched to a live view. This effectively prevents image shake caused by centering from discomforting photographers.

While the present embodiment is arranged so that an image captured by the imaging element 114 is displayed on the liquid crystal monitor 30 when the shake correction function is turned off, the image to be displayed on the liquid crystal monitor 30 need not be limited to this example. For instance, a predetermined image prepared in advance may be displayed. In this case, it is preferable to allow a user to arbitrarily register images to be displayed.

In the event that an image captured by the imaging element 114 is displayed, the image last displayed as a live view is preferably displayed.

In addition, when turning off the shake correction function, while the present embodiment is arranged so that the display of the liquid crystal monitor 30 is switched to a live view after confirming conclusion of centering of the correction lens 3A, the embodiment may alternatively be arranged to set a certain period of time and to center the correction lens 3A during the period of time. In other words, the embodiment may be arranged to set in advance a period of time necessary and sufficient for centering, and to switch the display of the liquid crystal monitor 30 to the live view after the period of time has lapsed.

In addition, while the present embodiment is arranged so that the shake correction function is switched on/off using the shake correction switch 44, devices used to switch on/off the shake correction function need not be limited to this example. For instance, such a device may be configured by a hold-down type button, whereby the shake correction function is switched on/off each time the button is pressed. In this case, the embodiment may be arranged so that either the shake correction function is automatically set to an on state or an off state, or the setting of the last termination is inherited when the imaging device 200 is turned on or when the mode is switched to photography mode.

While the above-described series of embodiments employed a method involving moving a portion of the photographic lens to correct image shake, shake correction methods need not be limited to this example. For instance, an image shake correction method may be used in which the imaging element is moved in a direction which cancels out image shake.

Moreover, while an example has been described for the series of embodiments provided above in which the present invention has been applied to a digital camera, application of the present invention need not be limited to this example, and the present invention may also be applied to all imaging devices and devices provided with imaging functions (such as video cameras, mobile telephones with built-in cameras and the like) comprising optical shake correction functions.

What is claimed is:

1. An imaging device having a shake correction device which corrects image shake by moving a portion of a photographic lens or by moving an imaging element, and which is capable of displaying images obtained from the imaging element as a live view on a monitor prior to photography, the imaging device comprising:
   a switching device which switches ON/OFF of the shake correction device; and
   a display control device which turns OFF a display of the live view on the monitor for a predetermined period of time, upon deactivation of the shake correction device by the switching device,
   wherein the shake correction device centers while the display of the live view on the monitor is turned OFF when the shake correction device is deactivated by the switching device, and the display control device turns ON the display upon completion of the centering of the shake correction device.

2. The imaging device according to claim 1, wherein the display control device turns OFF the display of the live view on the monitor for the predetermined period of time and displays a predetermined image on the monitor when the shake correction device is deactivated by the switching device.

3. The imaging device according to claim 2, wherein the predetermined image to be displayed on the monitor is the image last displayed on the monitor as the live view.

4. The imaging device according to claim 2, further comprising a device which registers the predetermined image to be displayed on the monitor.

5. The imaging device according to claim 1, wherein the live view turns OFF in response to a user deactivation of the shake correction device via the switching device.

6. The imaging device according to claim 1, wherein the shake correction device consists of a single form of shake correction.

7. The imaging device according to claim 5, wherein the shake correction device consists of a single form of shake correction.

8. An imaging device having a shake correction device which corrects image shake by moving a portion of a photographic lens or by moving an imaging element, and which is capable of displaying images obtained from the imaging element as a live view on a monitor prior to photography, the imaging device comprising:

as operating modes, at least a first photography mode which performs photography while operating the shake correction device, a second photography mode which performs photography without operating the shake correction device, and a playback mode which playback-displays photographed images on the monitor, and a mode switching device which switches the operating modes, wherein the imaging device, which is capable of switching operating modes by the mode switching device comprises:

a display control device which turns OFF the display of the live view on the monitor for a predetermined period of time when the operating mode is switched by the mode switching device, and the display control device turns ON the display upon completion of the centering of the shake correction device, and wherein the shake correction device, which centers while the display of the live view on the monitor is turned OFF when the operating mode, is switched from the first photography mode to another mode by the mode switching device, and wherein the shake correction device is activated when the first photography mode is set by the mode switching device, and is deactivated when a photography mode other than the first photography mode is set by the mode switching device.

9. The imaging device according to claim 8, wherein the display control device turns OFF the display of the live view on the monitor for the predetermined period of time and displays a predetermined image on the monitor when the shake correction device is deactivated by the switching device.

10. The imaging device according to claim 9, wherein the predetermined image to be displayed on the monitor is the image last displayed on the monitor as the live view.

11. The imaging device according to claim 9, further comprising a device which registers the predetermined image to be displayed on the monitor.

12. The imaging device according to claim 8, wherein the mode switching device is either a dial-type or sliding mode switch.

13. An imaging device having a shake correction device which corrects image shake by moving a portion of a photographic lens or by moving an imaging element, and which is capable of displaying images obtained from the imaging element as a live view on a monitor prior to photography, the imaging device comprising:

a switching device which switches to turn ON/OFF the shake correction device;

a first display control device which turns OFF a display of the live view on the monitor when the shake correction device is deactivated by the switching device;

a drive control device which makes the shake correction device center when the display of the live view on the monitor is turned OFF by the first display control device; and a second display control device which turns ON the display of the live view on the monitor upon completion of centering of the shake correction device.

14. The imaging device according to claim 13, wherein the first display control device turns OFF the display of the live view on the monitor for a predetermined period of time, and displays the predetermined image on the monitor when the shake correction device is deactivated by the switching device.

15. The imaging device according to claim 14, wherein the predetermined image to be displayed on the monitor is the image last displayed on the monitor as the live view.

16. The imaging device according to claim 14 further comprising a device which registers the predetermined image to be displayed on the monitor.

17. The imaging device according to claim 13 further comprising a device which turns ON/OFF the power, and wherein the shake correction device centers when the power is ON, and wherein the monitor turns ON the display after completion of centering of shake correction device when the power is ON.

* * * * *